US011472931B2

(12) United States Patent
Martinez-Rubi et al.

(10) Patent No.: US 11,472,931 B2
(45) Date of Patent: Oct. 18, 2022

(54) METHODS FOR PREPARING SUPERHYDROPHOBIC NANO-MICROSCALE PATTERNED FILMS

(71) Applicant: NATIONAL RESEARCH COUNCIL OF CANADA, Ottawa (CA)

(72) Inventors: Yadienka Martinez-Rubi, Ottawa (CA); Benoit Simard, Ottawa (CA); Stéphane Dénommée, Gatineau (CA); Keun Su Kim, Ottawa (CA); Fuyong Cheng, Ottawa (CA)

(73) Assignee: National Research Council of Canada, Ottawa (CA)

( * ) Notice: Subject to any disclaimer, the term of this patent is extended or adjusted under 35 U.S.C. 154(b) by 219 days.

(21) Appl. No.: 16/619,519

(22) PCT Filed: Jul. 4, 2018

(86) PCT No.: PCT/CA2018/050817
§ 371 (c)(1),
(2) Date: Dec. 5, 2019

(87) PCT Pub. No.: WO2019/006549
PCT Pub. Date: Jan. 10, 2019

(65) Prior Publication Data
US 2020/0199307 A1      Jun. 25, 2020

Related U.S. Application Data

(60) Provisional application No. 62/528,579, filed on Jul. 5, 2017.

(51) Int. Cl.
| | |
|---|---|
| *C08J 5/18* | (2006.01) |
| *C08K 3/04* | (2006.01) |
| *C08K 3/38* | (2006.01) |
| *C09D 7/61* | (2018.01) |
| *C09D 7/40* | (2018.01) |
| *C08J 3/215* | (2006.01) |
| *B82Y 30/00* | (2011.01) |
| *B82Y 40/00* | (2011.01) |

(52) U.S. Cl.
CPC ............. *C08J 3/215* (2013.01); *C08J 5/18* (2013.01); *C08K 3/041* (2017.05); *C08K 3/38* (2013.01); *C09D 7/61* (2018.01); *C09D 7/66* (2018.01); *C09D 7/70* (2018.01); *B82Y 30/00* (2013.01); *B82Y 40/00* (2013.01); *C08J 2339/04* (2013.01); *C08J 2341/00* (2013.01); *C08J 2365/00* (2013.01); *C08K 2003/385* (2013.01); *C08K 2201/011* (2013.01)

(58) Field of Classification Search
CPC ..... C08J 5/18; C08K 3/04; C08K 3/38; C09D 7/61; C09D 7/40
USPC ...................................................... 524/496
See application file for complete search history.

(56) References Cited

U.S. PATENT DOCUMENTS

| | | | |
|---|---|---|---|
| 9,062,219 B2 | 6/2015 | Qi et al. | |
| 9,115,424 B2 | 8/2015 | Aria et al. | |
| 2009/0118420 A1* | 5/2009 | Zou .................. | C08L 53/00 |
| | | | 524/577 |
| 2010/0330277 A1 | 12/2010 | Ajayaghosh et al. | |
| 2013/0062577 A1 | 3/2013 | Lin et al. | |

FOREIGN PATENT DOCUMENTS

| | | |
|---|---|---|
| JP | 2003-292801 A | 10/2003 |
| KR | 20150096576 A | 8/2015 |

OTHER PUBLICATIONS

Extended European Search Report dated Mar. 2, 2021.
English Machine Translation of KR20150096576A.
Luo, C. et al. (2008) Flexible Carbon Nanotube—Polymer Composite Films with High Conductivity and Superhydrophobicity Made by Solution Process. Nano Letters. 8(12). pp. 4454-4458.
Zou, J. et al. (2008) Preparation of a Superhydrophobic and Conductive Nanocomposite Coating from a Carbon-Nanotube-Conjugated Block Copolymer Dispersion. Adv. Mater. 20. pp. 3337-3341.
Boinovich L.-B., et al. (2012) Origins of Thermodynamically Stable Superhydrophobicity of Boron Nitride Nanotubes Coatings. Langmuir. 28, 1206-1216.
Darmanin T., et al. (2012) Synthesis, Characterization and Surface Wettability of Polythiophene Derivatives Containing Semi-Fluorinated Liquid-Crystalline Segment. Journal of Fluorine Chemistry. 134, 85-89.
De Nicola F., et al. (2015) Multi-Fractal Hierarchy of Single-Walled Carbon Nanotube Hydrophobic Coatings. Scientific Reports. 5, 8583, 9 pages.
De Francisco R., et al. (2014) Multipurpose Ultra and Superhydrophobic Surfaces Based on Oligodimethylsiloxane-Modified Nanosilica. ACS Applied Materials & Interfaces. 6, 18998-19010.
Ding J., et al. (2002) Synthesis and Characterization of Alternating Copolymers of Fluorene and Oxadiazole. Macromolecules. 35, 3474-3483.
Ding J., et al. (2014) Enrichment of Large-Diameter Semiconducting SWCNTs by Polyfluorene Extraction for High Network Density Thin Film Transistors. Nanoscale. 6, 2328-2339.
Gao Z., et al. (2013) Noncovalent Functionalization of Boron Nitride Nanotubes Using Water-Soluble Synthetic Polymers and the Subsequent Preparation of Superhydrophobic Surfaces. Polymer Journal. 45, 567-570.
Gao Z., et al. (2014) Noncovalent Functionalization of Boron Nitride Nanotubes in Aqueous Media Opens Application Roads in Nanobiomedicine. Nanobiomedicine. 1:7 Doi: 10.5772/60000.

(Continued)

*Primary Examiner* — Deve V Hall

(57) ABSTRACT

The present application discloses methods for preparing superhydrophobic nano-microscale patterned films, films pre-pared from such methods and uses of such films as superhydrophobic coatings. The superhydrophobic nano-microscale patterned films comprise high aspect ratio nanoparticles such as boron nitride nanotubes (BNNTs) and/or carbon nanotubes (CNTs).

16 Claims, 9 Drawing Sheets

(56) References Cited

OTHER PUBLICATIONS

Kim K.-S., et al. (2014) Hydrogen-Catalyzed, Pilot-Scale Production of Small-Diameter Boron Nitride Nanotubes and Their Macroscopic Assemblies. ACS Nano. 8(6), 6211-6220.

Li Y., et al. (2004) Synthesis and Properties of Random and Alternating Fluorene/Carbazole Copolymers for Use in Blue Light-Emitting Devices. Chem. Mater. 16, 2165-2173.

Li L.-H., et al. (2009) Superhydrophobic Properties of Nonaligned Boron Nitride Nanotube Films. Langmuir Article. 26(7), 5135-5140.

Li L., et al. (2012) Controlling Wettability of Boron Nitride Nanotube Films and Improved Cell Proliferation. J. Phys. Chem. C. 116(34), 18334-18339.

Martinez-Rubi Y., et al. (2015) Self-Assembly and Visualization of Poly(3-hexyl-thiophene) Chain Alignment along Boron Nitride Nanotubes. J. Phys. Chem. C. 119, 26605-26610.

Meng W., et al. (2014) Polymer Composites of Boron Nitride Nanotubes and Nanosheets. J. Mater. Chem. C. 2, 10049-10061.

Nasrabadi A.-T., et al. (2010) Interactions between Polymers and Single-Walled Boron Nitride Nanotubes: A Molecular Dynamics Simulation Approach. J. Phys. Chem. B. 114, 15429-15436.

Pernites R.-B., et al. (2012) Tunable Protein and Bacterial Cell Adsorption on Colloidally Templated Superhydrophobic Polythiophene Films. Chemistry of Materials. 24, 870-880.

Smith M.-K., et al. (2015) Poly(3-hexylthiophene) Nanotube Array Surfaces with Tunable Wetting and Contact Thermal Energy Transport. ACS Nano. 9(2), 1080-1088.

Velayudham S., et al. (2010) Noncovalent Functionalization of Boron Nitride Nanotubes with Poly(p-phenylene-ethynylene)s and Polythiophene. Applied Materials & Interfaces. 2(1), 104-110.

Zhou J., et al. (2008) Preparation of a Superhydrophobic and Conductive Nanocomposite Coating from a Carbon-Nanotube-Conjugated Block Copolymer Dispersion. Adv. Mater. 20, 3337-3341.

International Search Report and Written Opinion dated Sep. 27, 2018.

Notice of Reasons for Rejection dated Mar. 29, 2022.

English Translation of the Notice of Reasons for Rejection dated Mar. 29, 2022.

English Abstract for JP 2003-292801.

* cited by examiner

605

METHODS FOR PREPARING SUPERHYDROPHOBIC NANO-MICROSCALE PATTERNED FILMS

CROSS-REFERENCE TO RELATED APPLICATIONS

The present application is a national phase entry of International Patent Application PCT/CA2018/050817 filed on Jul. 4, 2018, which claims the benefit of priority of U.S. provisional application no. 62/528,579 filed on Jul. 5, 2017, the contents of each of which are incorporated herein by reference in their entirety.

FIELD

The present application relates to methods for preparing superhydrophobic nano-microscale patterned films, films prepared from such methods and uses of such films as superhydrophobic coatings.

BACKGROUND

There is a significant interest in using superhydrophobic surfaces for different applications, such as but not limited to for use as a water-repellant, self-cleaning, anti-fog, anti-icing, anti-bio-fouling, desalination, low-friction and/or anti-corrosion surface. Currently there are still efforts needed to resolve both, the principle understanding of wetting and to define methodologies to fabricate superhydrophobic surfaces on small and/or large scales.

Achieving a superhydrophobic surface is dependent, for example, on two main features: the chemical composition of the surface (e.g. the use of low surface energy materials) and its morphological structure (e.g. through use of rough hierarchical micro/nanostructure). Fluorinated compounds are commonly used; however, there have been concerns about the toxicity of these materials. Surface roughness has been created using techniques such as but not limited to CVD and lithography. However, such processes are costly and may, for example, be difficult to scale up. Other issues with known hydrophobic surfaces include, for example, adhesion, transparency, durability, nanostructure stability and/or thermal stability. A stable micro- and nanotopography has also not been easy to achieve as polymer strands tended to be easily matted down and thus quickly lost their superhydrophobic behaviour. Additionally, some superhydrophobic surfaces may repel water but do not repel water vapour thereby allowing condensation to occur which may result in substantial surface wetting.

Boinovich et al.[1] disclose superhydrophobic surfaces in which coatings of short and long boron nitride nanotubes (BNNTs) were grown on a silicon substrate. Vertically aligned carbon nanotube (CNT) arrays have also been employed. For example, U.S. Pat. No. 9,115,424 discloses methods for producing a superhydrophobic CNT array providing a vertically aligned CNT array and performing vacuum pyrolysis thereon to produce the superhydrophobic CNT array.

Other methods have not produced superhydrophobic CNT films. For example, De Nicola et al.[2] disclose preparing single-walled carbon nanotube (SWCNT) films by vacuum filtering an aqueous dispersion through a mixed cellulose ester filter, then depositing such films by a dry-transfer printing method. The maximum contact angle reported by De Nicola et al. for such films is 109.4° which corresponds only to hydrophobic behaviour.

Gao et al. (2013)[3] disclose aqueous dispersions of BNNTs functionalized with water-soluble synthetic polymers. A dispersion of BNNTs functionalized with poly(xylylene tetrahydrothiophenium chloride) (PXT) was dropped onto a silicon wafer, followed by treatment at 240° C. for 6 hours to chemically convert the PXT into poly(p-phenylene vinylene) (PPV). Before thermal treatment, the contact angle was only measured to be 137±1°. After thermal treatment, the contact angle was still only measured to be 151±1°. These studies are also referenced in the review article by Gao et al. (2014)[4].

SUMMARY

The properties of high aspect ratio nanoparticles such as BNNTs, which include, for example, in the case of BNNTs, outstanding mechanical properties, transparency in the visible region, high thermal stability and/or conductivity, may, for example, be useful in superhydrophobic materials. In the studies described in greater detail herein below, suspensions in organic solvents were obtained by non-covalent functionalization of BNNTs or CNTs with conjugated polymers bearing alkyl chains that modify the surface energy of the BNNTs and CNTs. The suspensions were then filtered using a membrane with a defined microscale morphology which templated the surface roughness of the film thereby produced. The surface texture, or roughness, enhances the intrinsic hydrophobic chemistry of the surface, producing highly non-wetting surfaces. This method allows for design of the micro/nanostructure of the surface and low surface energy requirements and has been used to prepare superhydrophobic surfaces. The dried films showed water contact angles of 150-170° and could also be transferred to different substrates such as polycarbonate and glass.

Accordingly, the present application includes a method for preparing a superhydrophobic nano-microscale patterned film, the method comprising:

filtering a suspension comprising high aspect ratio nanoparticles non-covalently functionalized with a conjugated polymer bearing alkyl side-chains in an organic solvent through a membrane having a desired microscale surface morphology to obtain a wet film, wherein the membrane microscale surface morphology is templated on a surface of the wet film; and drying the film to obtain the nano-microscale patterned superhydrophobic film.

The present application also includes a method for preparing a superhydrophobic nano-microscale patterned film, the method comprising:

filtering at least one suspension comprising high aspect ratio nanoparticles non-covalently functionalized with a conjugated polymer bearing alkyl side-chains in an organic solvent through a membrane having a desired microscale surface morphology to obtain a wet film, wherein the membrane microscale surface morphology is templated on a surface of the wet film; and drying the film to obtain the nano-microscale patterned superhydrophobic film.

The present application also includes a superhydrophobic nano-microscale patterned film comprising high aspect ratio nanoparticles, the film having a static contact angle greater than 150°. In some embodiments, the superhydrophobic film is prepared from a method for preparing a superhydrophobic nano-microscale patterned film of the present application.

In some embodiments of the application, the high aspect ratio nanoparticles are boron nitride nanotubes (BNNTs). In some embodiments of the application, the high aspect ratio nanoparticles are carbon nanotubes (CNTs). In some embodiments of the application, the high aspect ratio nanoparticles are a mixture of boron nitride nanoparticles (BNNTs) and carbon nanotubes (CNTs).

The present application further includes a coating comprising a superhydrophobic nano-microscale patterned film of the present application.

The present application yet further includes a method for preparing a water-repellant, self-cleaning, anti-fog, anti-icing, anti-bio-fouling, desalination, low-friction and/or anti-corrosion surface comprising applying a superhydrophobic nano-microscale patterned film of the present application to a surface as well as a use of a superhydrophobic BNNT nano-microscale patterned film of the present application for preparing a water-repellant, self-cleaning, anti-fog, anti-icing, anti-bio-fouling, desalination, low-friction and/or anti-corrosion surface.

Other features and advantages of the present application will become apparent from the following detailed description. It should be understood, however, that the detailed description and the specific examples while indicating embodiments of the application are given by way of illustration only, since various changes and modifications within the spirit and scope of the application will become apparent to those skilled in the art from this detailed description.

BRIEF DESCRIPTION OF THE DRAWINGS

The present application will now be described in greater detail with reference to the drawings in which.

DETAILED DESCRIPTION

I. Definitions

Figure 1:
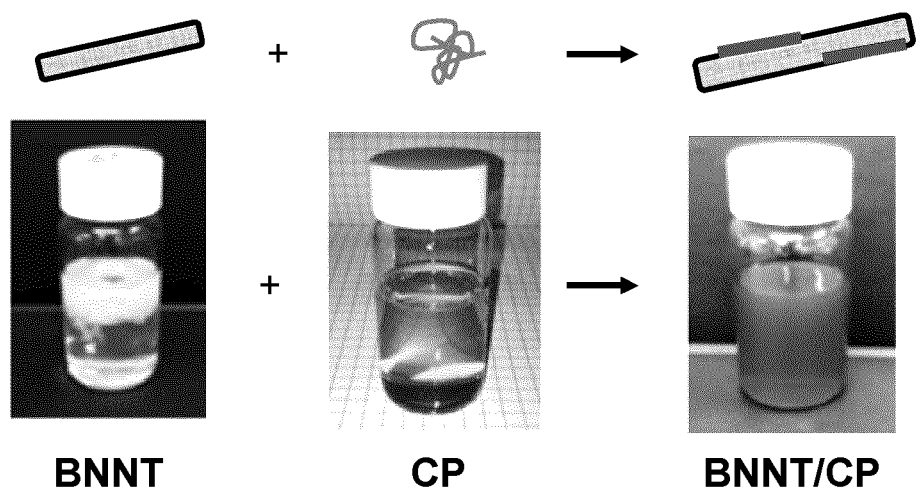
FIG. 1 shows photographs of a boron nitride nanotube (BNNT) suspension in chloroform (bottom left), a conjugated polymer (CP) in solution in chloroform (bottom middle) and a suspension in chloroform of the boron nitride nanotube non-covalently functionalized with the conjugated polymer (BNNT/CP) bottom right) in exemplary embodiments of the application; as well as corresponding schematic diagrams showing an exemplary BNNT (top left); an exemplary CP in a coil-like conformation (top middle); and an exemplary BNNT non-covalently functionalized by CPs which are planar along the BNNT (top right).

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

As used in this application, the singular forms "a", "an" and "the" include plural references unless the content clearly dictates otherwise. For example, an embodiment including "a conjugated polymer" should be understood to present certain aspects with one conjugated polymer or two or more additional conjugated polymers. In embodiments comprising an "additional" or "second" component, such as an additional or second conjugated polymer, the second component as used herein is chemically different from the other components or first component. A "third" component is different from the other, first, and second components, and further enumerated or "additional" components are similarly different.

The term "suitable" as used herein means that the selection of the particular compound, material or conditions would depend on the specific manipulation to be performed, and the identity of the compound or material to be transformed, but the selection would be well within the skill of a person trained in the art. All process/method steps described herein are to be conducted under conditions sufficient to provide the product shown. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

The term "hydrophobic" as used herein in reference to a surface refers to a material with a water droplet static contact angle greater than 90°.

The term "superhydrophobic" as used herein in reference to a surface refers to a material with a water droplet static contact angle greater than 150°.

The term "static contact angle" as used herein refers to the contact angle of a static drop on a surface. For example, the contact angle of a water droplet on a surface is measured herein using an Attension Theta Optical Tensiometer.

The term "alkyl" as used herein, whether it is used alone or as part of another group, means straight or branched chain, saturated alkyl groups. The number of carbon atoms that are possible in the referenced alkyl group are indicated by the numerical prefix "$C_{n1-n2}$". For example, the term $C_{16-24}$ alkyl means an alkyl group having 16, 17, 18, 19, 20, 21, 22, 23 or 24 carbon atoms.

The term "aspect ratio" as used herein in reference to a nanoparticle refers to the ratio of the length to the diameter of the nanoparticle.

The term "high aspect ratio nanoparticle" as used herein refers to a particle having an average diameter on the nanometer scale (e.g. from about 1 nm to about 100 nm) and an average length that is significantly greater, for example it is typically on the micrometer scale (e.g. from about 0.5 μm to about 3 mm) such that the aspect ratio can be, for example, greater than about 1000. Examples of "high aspect ratio nanoparticles" as that term is used herein include boron nitride nanotubes (BNNTs), carbon nanotubes (CNTs), and other suitable inorganic nanotubes of the metal dichalcogenides (e.g. $WS_2$, $MoS_2$), halides (e.g. $NiCl_2$), oxides (e.g. $TiO_2$, ZnO), and nitrides (e.g. AlN, GaN).

The term "boron nitride nanotube" and the abbreviation "BNNT" as used herein refer to a polymorph of boron nitride that is in the form of a high aspect ratio hollow nanotube which can be single-walled, double-walled or multi-walled and in which the walls are made up of six-membered rings of alternating boron and nitrogen atoms connected together in a graphene-like configuration and includes both straight-walled and bamboo structures.

The terms "carbon nanotube" and "CNT" as used herein refer to a polymorph of carbon that is in the form of a hollow nanotube which can be single-walled, double-walled or multi-walled and in which the walls are made up of six-membered carbon rings connected together in a graphene-like configuration.

The term "nano-microscale patterned" as used herein in reference to a superhydrophobic film having such a pattern refers to a pattern which has features with at least one dimension that is on the micrometer scale and features with at least one dimension that is on the nanometer scale. In the methods of the present application, the features with at least one dimension that is on the micrometer scale are templated on a surface of the film using a membrane having a desired microscale surface morphology; i.e. a surface morphology having at least one dimension that is on the micrometer scale. The features with at least one dimension that is on the nanometer scale arise from the high aspect ratio nanoparticles which are embedded in the conjugated polymer bearing alkyl side-chains; i.e. the high aspect ratio nanoparticles are coated (or non-covalently functionalized) with the conjugated polymer bearing alkyl side chains.

II. Methods

Suspensions in organic solvents prepared by non-covalent functionalization of high aspect ratio nanoparticles such as BNNTs or CNTs with conjugated polymers bearing alkyl chains that modified the surface energy of the BNNTs or CNTs were filtered using a membrane with a defined microscale surface morphology to template the surface roughness onto the film thereby produced. The surface texture, or roughness, enhanced the intrinsic hydrophobic chemistry of the surface, producing highly non-wetting surfaces. This method allows for design of the micro/nanostructure of the surface and low surface energy requirements and has been used to prepare superhydrophobic surfaces.

Accordingly, the present application includes a method for preparing a superhydrophobic nano-microscale patterned film, the method comprising:

filtering a suspension comprising high aspect ratio nanoparticles non-covalently functionalized with a conjugated polymer bearing alkyl side-chains in an organic solvent through a membrane having a desired microscale surface morphology to obtain a wet film, wherein the membrane microscale surface morphology is templated on a surface of the wet film; and drying the film to obtain the superhydrophobic nano-microscale patterned film.

The present application also includes a method for preparing a superhydrophobic nano-microscale patterned film, the method comprising:

filtering at least one suspension comprising high aspect ratio nanoparticles non-covalently functionalized with a conjugated polymer bearing alkyl side-chains in an organic solvent through a membrane having a desired microscale surface morphology to obtain a wet film, wherein the membrane microscale surface morphology is templated on a surface of the wet film; and drying the film to obtain the superhydrophobic nano-microscale patterned film.

In an embodiment, one suspension comprising high aspect ratio nanoparticles non-covalently functionalized with a conjugated polymer bearing alkyl side-chains in an organic solvent is filtered through the membrane having a desired microscale surface morphology to obtain the wet film.

In another embodiment, more than one suspension comprising high aspect ratio nanoparticles non-covalently functionalized with a conjugated polymer bearing alkyl side-chains in an organic solvent are filtered through the membrane having a desired microscale surface morphology to obtain the wet film. It will be appreciated by a person skilled in the art that in such embodiments, the identities of the high aspect ratio nanoparticles and/or the conjugated polymer bearing alkyl side-chains in each suspension vary.

In some embodiments, the suspensions are filtered simultaneously. In some embodiments, the suspensions are filtered sequentially. For example, in embodiments wherein the suspensions are filtered sequentially, it would be appreciated by the person skilled in the art that a first suspension may be filtered through the membrane until substantially all of the organic solvent has passed through (i.e. a first wet film layer has been deposited on the membrane), then a second suspension may be filtered through the membrane until substantially all of the organic solvent has passed through (i.e. a second wet film layer has been deposited on the first wet film layer), and so on, until all of the suspensions have been filtered through the membrane. In such embodiments, the wet film is thus made up of wet film layers, each wet film layer corresponding to a suspension.

In some embodiments, two suspensions comprising high aspect ratio nanoparticles non-covalently functionalized with a conjugated polymer bearing alkyl side-chains in an organic solvent are filtered through the membrane having a desired microscale surface morphology to obtain the wet film.

In an embodiment, the suspension is prepared by mixing a solution comprising the conjugated polymer bearing alkyl side-chains with a suspension comprising the high aspect ratio nanoparticles. In an embodiment, the mixing of the suspension of high aspect ratio nanoparticles non-covalently functionalized with the conjugated polymer comprises sonicating the mixture of the conjugated polymer bearing alkyl side-chains with the suspension of the high aspect ratio nanoparticles for a time until a suspension is obtained, for example, for a time of about 10 minutes to about 12 hours or about 30 minutes. In some embodiments, the suspension is devoid of visible high aspect ratio nanoparticle agglomerates and/or visible sedimentation for a period of at least 2 hours.

The high aspect ratio nanoparticles can be any suitable high aspect ratio nanoparticles. In some embodiments of the application, the high aspect ratio nanoparticles are boron nitride nanotubes (BNNTs). In some embodiments of the application, the high aspect ratio nanoparticles are carbon nanotubes (CNTs). In some embodiments of the application, the high aspect ratio nanoparticles are inorganic nanotubes of the metal dichalcogenides (e.g. $WS_2$, $MoS_2$), halides (e.g. $NiCl_2$), oxides (e.g. $TiO_2$, ZnO) or nitrides (e.g. AlN, GaN).

In an embodiment wherein two suspensions comprising high aspect ratio nanoparticles non-covalently functionalized with a conjugated polymer bearing alkyl side-chains in an organic solvent are filtered sequentially through the membrane having a desired microscale surface morphology to obtain the wet film, the high aspect ratio nanoparticles of the first suspension are CNTs and the high aspect ratio nanoparticles of the second suspension are BNNTs. In another embodiment wherein two suspensions comprising high aspect ratio nanoparticles non-covalently functionalized with a conjugated polymer bearing alkyl side-chains in an organic solvent are filtered sequentially through the membrane having a desired microscale surface morphology to obtain the wet film, the high aspect ratio nanoparticles of the first suspension are BNNTs and the high aspect ratio nanoparticles of the second suspension are CNTs.

BNNTs can be prepared by various methods known in the art, including but not limited to those which comprise induction thermal plasma, arc discharge, laser vaporization, chemical vapor deposition (e.g. using borazine or a mixture of boron powder and metal oxide as a feedstock), ball milling and a pressurized vapor/condenser. For example, suitable BNNTs for use in the embodiments of the present application can be prepared as described in Kim, K. S.; Kingston, C. T.; Hrdina, A.; Jakubinek, M. B.; Guan, J.; Plunkett, M.; Simard, B. "Hydrogen-Catalyzed, Pilot-Scale Production of Small-Diameter Boron Nitride Nanotubes and Their Macroscopic Assemblies" ACS Nano 2014, 8, 6211-6220.

CNTs can also be prepared by standard methods known to the person skilled in the art or alternatively can be obtained from commercial sources. In an embodiment, the CNTs are multi-walled carbon nanotubes (MWCNTs).

Inorganic nanotubes of the metal dichalcogenides (e.g. $WS_2$, $MoS_2$), halides (e.g. $NiCl_2$), oxides (e.g. $TiO_2$, ZnO) or nitrides (e.g. AlN, GaN) can also be prepared by standard methods known to the skilled person.

The organic solvent is any suitable organic solvent. The organic solvent will depend, for example, on the nature of the conjugated polymer bearing alkyl side-chains and a suitable organic solvent for the methods of the present application can be selected by a person skilled in the art. For example, it will be appreciated by the person skilled in the art that the conjugated polymer should be at least substantially soluble, preferably soluble in the organic solvent. In an embodiment, the solvent is chloroform ($CHCl_3$) or tetrahydrofuran (THF). In another embodiment, the conjugated polymer is a polythiophene bearing alkyl side chains and the solvent is chloroform. In a further embodiment, the conjugated polymer is a polyfluorene beating alkyl side chains or a poly(fluorene-co-pyridine) bearing alkyl side chains and the solvent is tetrahydrofuran (THF).

The conjugated polymer can be any suitable conjugated polymer that bears alkyl side-chains such that the high aspect ratio nanoparticle non-covalently functionalized with the conjugated polymer has a lowered surface energy and increased hydrophobicity in comparison to the high aspect ratio nanoparticle prior to non-covalent functionalization. The selection of a suitable conjugated polymer bearing alkyl side-chains can be made by a person skilled in the art and will depend, for example, on the nature of the high aspect ratio nanoparticle (e.g. possibility of interaction with the modifier by van der Waals forces, dipole-dipole, hydrophobic-hydrophobic and/or electrostatic interactions). In an embodiment, the conjugated polymer is a polythiophene, a polyfluorene, a poly(fluorene-co-pyridine) or a poly(thiophene-co-fluorene) bearing alkyl side chains. In another embodiment of the present application, the conjugated polymer is a polythiophene, a polyfluorene or a poly(fluorene-co-pyridine) bearing alkyl side chains. In a further embodiment, the conjugated polymer is selected from:

(a) a polythiophene of Formula I:

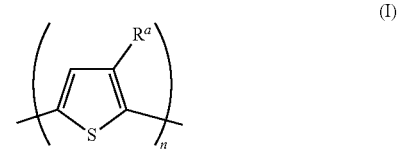

(I)

wherein $R^a$ is $C_{4-24}$alkyl and n is in the range of a soluble polythiophene of Formula I;

(b) a polyfluorene of Formula II:

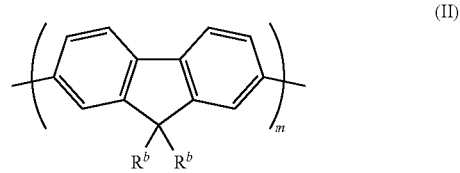

(II)

wherein each $R^b$ is independently $C_{6-24}$alkyl and m is in the range of a soluble polyfluorene of Formula II; and (c) a poly(fluorene-co-pyridine) of Formula III:

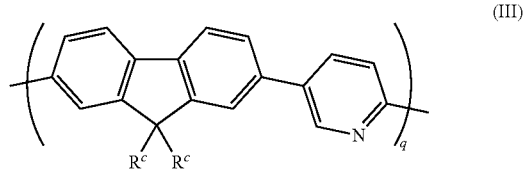

wherein each $R^c$ is independently $C_{6-24}$ alkyl and q is in the range of a soluble poly(fluorene-co-pyridine) of Formula III.

A person skilled in the art could readily select suitable values of n, m and q to obtain particular soluble polythiophenes of Formula I, polyfluorenes of Formula II and poly(fluorene-co-pyridine)s of Formula III, respectively. In an embodiment of the present application, n is an integer of from 10-200, m is an integer of from 10-100 and q is an integer of from 10-100.

In a further embodiment, $R^a$ is $C_{6-18}$alkyl, each $R^b$ is independently $C_{8-18}$alkyl, and each $R^c$ is $C_{8-18}$alkyl. In yet a further embodiment, $R^a$ is n-hexyl or n-octadecyl; each $R^b$ is n-octyl or n-octadecyl; and each $R^c$ is n-octadecyl. It is an embodiment that the conjugated polymer is a polythiophene of Formula I, wherein $R^a$ is n-hexyl or n-octadecyl. In another embodiment of the present application, the conjugated polymer is a polyfluorene of Formula II, wherein each $R^b$ is n-octyl or n-octadecyl. In a further embodiment, the conjugated polymer is a poly(fluorene-co-pyridine) of Formula III, wherein each $R^c$ is n-octadecyl.

The ratio by weight of the high aspect ratio nanoparticles (e.g. BNNTs) to the conjugated polymer is any suitable ratio such that substantially all of the high aspect ratio nanoparticle surface is covered by the conjugated polymer bearing alkyl side-chains and may depend, for example, on the identity of the high aspect ratio nanoparticle, the identity of the conjugated polymer and/or the purity of the high aspect ratio nanoparticle but can be readily determined by a person skilled in the art. For example, Martinez-Rubi et al. J. Phys. Chem. C 2015, 119, 26605-26610 estimated the coverage fora particular sample of boron nitride nanotubes (BNNTs). Values for CNTs are estimated to be similar to those for BNNTs. In an embodiment, the ratio by weight of the BNNTs to the conjugated polymer is from about 1:0.05 to about 1:1. In another embodiment, the ratio by weight of the BNNTs to the conjugated polymer is about 1:0.12. In yet another embodiment, the ratio by weight of the BNNTs to the conjugated polymer is about 1:0.15. In an embodiment, the ratio by weight of the CNTs to the conjugated polymer is from about 1:0.05 to about 1:1. In another embodiment, the ratio by weight of the CNTs to the conjugated polymer is about 1:0.12. In yet another embodiment, the ratio by weight of the CNTs to the conjugated polymer is about 1:0.15.

In an embodiment, the step of filtering the suspension comprises vacuum filtration through the membrane. Suitable conditions for vacuum filtration of a suspension through a membrane can be selected by a person skilled in the art.

The membrane material is any suitable membrane material. It will be appreciated by a person skilled in the art that a suitable membrane is, for example, compatible with the organic solvent used (i.e. the membrane is substantially inert to the organic membrane under the filtration conditions in that it will not, for example, dissolve and/or swell) and does not adhere to the superhydrophobic nano-microscale patterned film such that the film cannot readily be removed therefrom after drying. In an embodiment, the membrane comprises or consists essentially of poly(1,1,2,2-tetrafluoroethylene).

The membrane pore size is any suitable size. For example, the pore size is small enough such that the nanotubes are prevented from passing through to the filtrate during filtration. In an embodiment, the membrane has a pore size of about 0.2 µm to about 20 µm, about 0.2 µm to about 5 µm or about 1.2 µm.

In the experiments described in greater detail hereinbelow, an existing membrane was selected that had a suitable microscale surface morphology for templating a surface such that a superhydrophobic nano-microscale patterned film was obtained. However, the methods of the present application may, for example, be applied to membranes having a wide range of surface morphologies so long as the high aspect ratio nanoparticles can penetrate the concave regions of the surface morphology when a differential pressure (e.g. vacuum) is applied during the filtration step and so long as the membrane templates a pattern on the film having at least one dimension on the micrometer scale. It will also be appreciated by a person skilled in the art that the pores in the membrane are placed in suitable locations such that the application of the differential pressure (e.g. vacuum) will result in the nanoparticles penetrating the concave regions of the surface morphology.

Suitable membranes may be available from commercial sources. Alternatively, in some embodiments, a membrane of a desired size and microscale surface morphology may be designed for a particular end use of a superhydrophobic nano-scale patterned film prepared by the methods of the present application.

In an embodiment, the concave regions have a width of about 2 µm to about 30 µm or about 5 µm to about 15 µm and a length of about 0.1 cm to about 2 cm or about 0.5 cm to about 1.3 cm. In another embodiment, the concave regions have a width of about 2 µm to about 30 µm or about 5 µm to about 15 µm and a length that is substantially the same length as that dimension of the membrane. It will also be appreciated by a person skilled in the art that the space between the concave regions can be varied, for example, to prepare a film that has regions of superhydrophobicity and regions which are less hydrophobic.

In an embodiment, in the step of filtering the suspension, the membrane is housed in a filtration assembly and the method further comprises, prior to drying, removing the membrane with the wet film attached thereto from the filtration assembly. In an embodiment, the step of drying comprises drying the wet film attached to the membrane on a flat surface at ambient temperature and pressure (i.e. enough pressure to keep the film flat) followed by peeling the semi-dried film from the membrane and drying further at elevated temperature and reduced pressure. In an embodiment, the wet film is first dried at a temperature of about 15° C. to about 40° C. or about 20° C. to about 25° C. for a time of about 12 hours to about 15 hours, optionally placed between suitable materials such as between parchment paper and cellulose filter paper, then the semi-dried film is further dried at a temperature of about 60° C. to about 90° C. or about 75° C. for a time of about 1 hour to about 24 hours or about 2 hours, optionally wherein the film is placed on a non-stick surface such as a poly(1,1,2,2-tetrafluoroethylene) film.

III. Films, Coatings and Uses

The dried films prepared by the methods of the present application showed water contact angles of 150-170° and could also be transferred to different substrates such as polycarbonate and glass.

Accordingly, the present application includes a superhydrophobic nano-microscale patterned film having a static contact angle of greater than 150°. In some embodiments, the superhydrophobic nano-microscale patterned film comprises high aspect ratio nanoparticles non-covalently functionalized with a conjugated polymer bearing alkyl side chains. In some embodiments, the microscale morphology templated on the surface of the superhydrophobic nano-microscale patterned film is obtained using a membrane having a desired microscale surface morphology. The conjugated polymer bearing alkyl side chains, the high aspect ratio nanoparticles and the membrane having the desired microscale surface morphology can be varied as detailed herein in the embodiments for the methods for preparing a superhydrophobic nano-microscale patterned film of the present application. For example, in some embodiments, the high aspect ratio nanoparticles are boron nitride nanotubes (BNNTs). In some embodiments, the high aspect ratio nanoparticles are carbon nanotubes (CNTs). In some embodiments, the high aspect ratio nanoparticles are a mixture of boron nitride nanotubes (BNNTs) and carbon nanotubes (CNTs).

In an embodiment wherein the high aspect ratio nanoparticles are a mixture of BNNTs and CNTs, the nanoscale features arise from the BNNTs. For example, it will be appreciated by a person skilled in the art that such films may be prepared by sequentially filtering a suspension comprising the BNNTs followed by a suspension comprising the CNTs according to embodiments detailed herein for the methods for preparing a superhydrophobic nano-microscale patterned film of the present application. In another embodiment wherein the high aspect ratio nanoparticles are a mixture of BNNTs and CNTs, the nanoscale features arise from the CNTs. For example, it will be appreciated by a person skilled in the art that such films may be prepared by sequentially filtering a suspension comprising the CNTs followed by a suspension comprising the BNNTs according to embodiments detailed herein for the methods for preparing a superhydrophobic nano-microscale patterned film of the present application.

In some embodiments, the superhydrophobic nano-microscale patterned film is prepared from a method for preparing a superhydrophobic nano-microscale patterned film of the present application. In an embodiment, the superhydrophobic nano-microscale patterned film has a static water contact angle greater than 152°. In an embodiment, the superhydrophobic nano-microscale patterned film has a static water contact angle greater than 155°. In another embodiment, the superhydrophobic nano-microscale patterned film has a static water contact angle greater than 160°. In a further embodiment, the superhydrophobic nano-microscale patterned film has a static water contact angle greater than 165°. In yet a further embodiment, the superhydrophobic nano-microscale patterned film has a static water contact angle less than 170°. It is an embodiment that the superhydrophobic nano-microscale patterned film has a static water contact angle that is from about 150° to about 170° or about 152° to about 170°. In another embodiment, the superhydrophobic nano-microscale patterned film has a static water contact angle that is from about 155° to about 170°. In a further embodiment, the superhydrophobic nano-microscale patterned film has a static water contact angle that is from about 160° to about 170°. In yet a further embodiment, the superhydrophobic nano-microscale patterned film has a static water contact angle that is from about 165° to about 170°.

The present application also includes a coating comprising a superhydrophobic nano-microscale patterned film of the present application. In an embodiment, the coating comprising the superhydrophobic nano-microscale patterned film is on a surface comprising any suitable thermoplastic polymer (such as but not limited to polycarbonate) or glass.

The present application also includes a method for preparing a water-repellant, self-cleaning, anti-fog, anti-icing, anti-bio-fouling, desalination, low-friction and/or anti-corrosion surface comprising applying a superhydrophobic nano-microscale patterned film of the present application to a surface. The present application also includes a use of a superhydrophobic nano-microscale patterned film of the present application for preparing a water-repellant, self-cleaning, anti-fog, anti-icing, anti-bio-fouling, desalination, low-friction and/or anti-corrosion surface.

The following non-limiting examples are illustrative of the present application:

EXAMPLES

Example 1

Method for Preparing Superhydrophobic Boron Nitride Nanotube-Containing Films and Coatings

*General Preparation of the functionalized nanotube (NT) suspensions with conjugated polymers (CP)*: BNNT were prepared as described in Kim, K. S.; Kingston, C. T.; Hrdina, A.; Jakubinek, M. B.; Guan, J.; Plunkett, M.; Simard, B. "Hydrogen-Catalyzed, Pilot-Scale Production of Small-Diameter Boron Nitride Nanotubes and Their Macroscopic Assemblies". ACS Nano 2014, 8, 6211-6220. CNT: NC7000TM industrial grade MWCNTs were obtained from Nanocyl SA (Belgium). NTs (boron nitride nanotubes or carbon nanotubes) were suspended in chloroform ($CHCl_3$) or tetrahydrofuran (THF) with the aid of a sonication bath for 30 min at room temperature. Then a solution of the CP in CHCl3 or THF (0.5 mg/mL) was added to the NT suspension at a NT:CP weight ratio of 1:0.12 followed by bath sonication for 30 min until a stable NT/CP suspension was obtained. FIG. 1 shows photographs of an exemplary boron nitride nanotube (BNNT) suspension in chloroform (bottom left), an exemplary conjugated polymer (CP) in solution in chloroform (bottom middle) and an exemplary suspension in chloroform of the boron nitride nanotube non-covalently functionalized with the conjugated polymer (BNNT/CP; bottom right) as well as corresponding schematic diagrams (top).

Scheme 1 shows the general structures of the polythiophene (PT), polyfluorene (PF) and polyfluorene-pyridine (PFPy) conjugated polymers used in this study. Table 1 provides additional details on these conjugated polymers.

Scheme 1

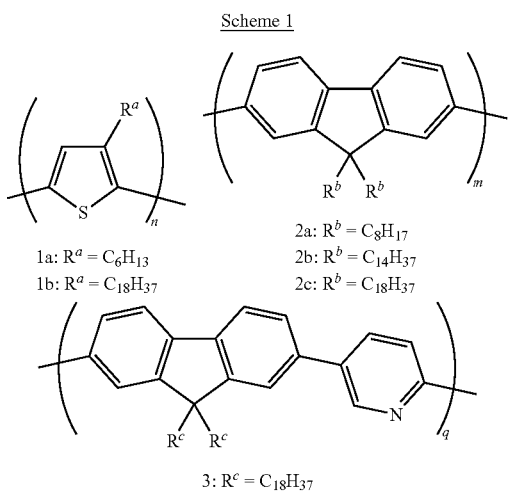

Figure 2:
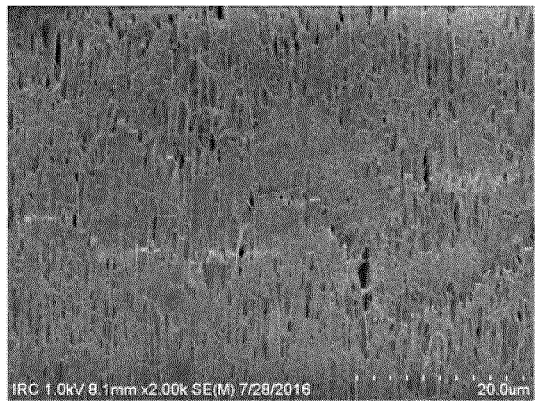
FIG. 2 shows scanning electron microscopy (SEM) images of the smooth side (left) and the patterned side (right) of the Teflon™ filter membrane used in embodiments of the present application. Scale bar shows 20.0 µm.
Figure 2:
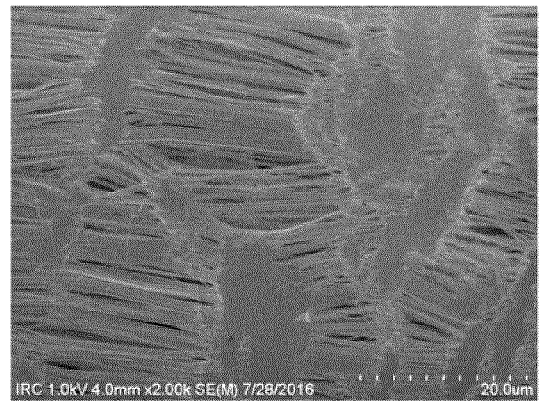
Figure 3:
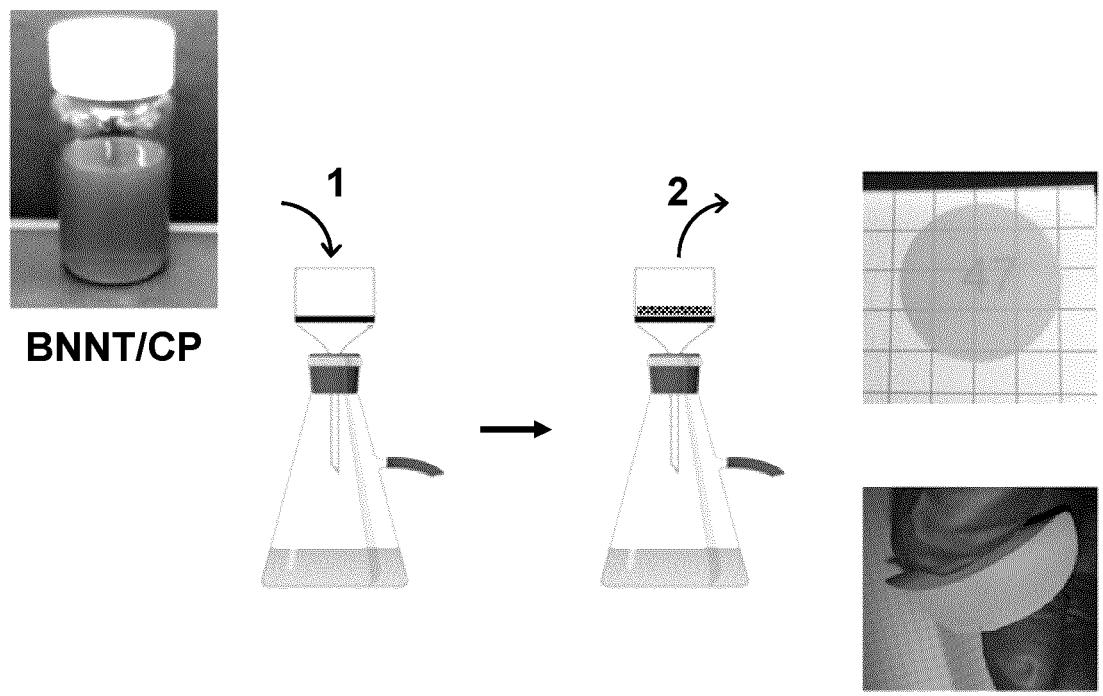
FIG. 3 is a schematic showing the preparation of BNNT/CP films according to an embodiment of the methods of the present application as well as photographs of the BNNT/CP suspension (far left), a BNNT/polyfluorene film (upper right) and bending of a BNNT/polythiophene film (lower right).

General Preparation of the NT/CP superhydrophobic films: NT/CP films were prepared by vacuum filtration. The NT/CP suspension was vacuum filtered using a Polytetrafluoroethylene (PTFE) membrane filter from Sartorius™ (11803-47-N, Pore size: 1.2 µm) in a Millipore™ vacuum filtration assembly. The rough side of the PTFE membrane (FIG. 2; right hand image) was placed in contact with the NT/CP suspension. In other words, the membrane was inverted in comparison to its standard use in a vacuum filtration assembly which would place the smooth side (FIG. 2; left hand image) in contact with the NT/CP suspension. PTFE fibers on the rough side of the Teflon membrane create a pattern of cavities (about 5-20 µm in length and about 0.2-1 µm in width) that are closely packed and distributed on the surface. The individualized nanotubes in solution can penetrate these cavities/openings when any differential pressure (e.g. vacuum) is applied during filtration which generates an organized microscale architecture (about 5-20 µm in length and about 0.5-2 µm in width) of areas of nanotubes sticking out of plane of the film, a negative copy of the cavity/pore structure of the membrane. This way the PTFE membrane was used both to recover the assembled NT/CP films and to template the NT/CP film surface morphology (FIG. 3). In contrast, vacuum filtration using the smooth side of the membrane may be used to recover a film but would not template the desired microscale film surface morphology.

Figure 4:
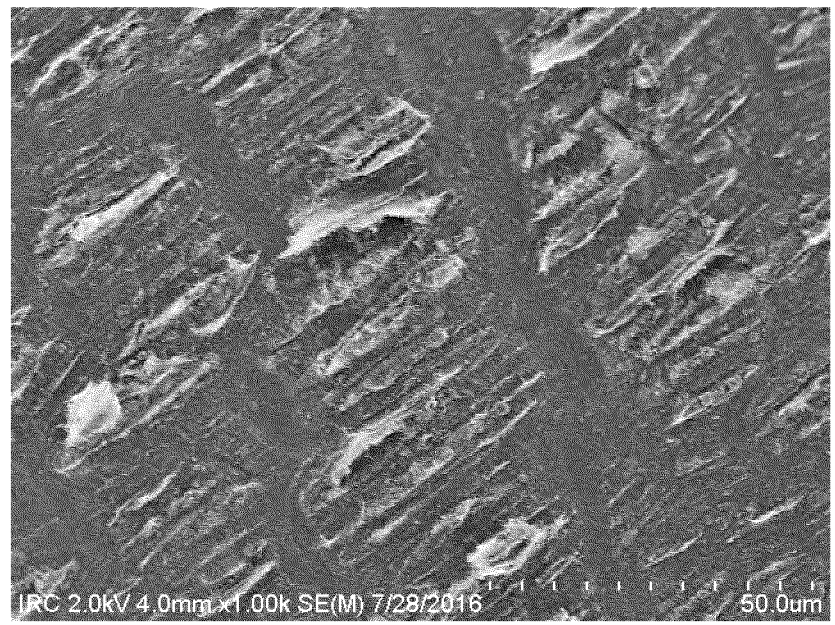
FIG. 4 shows an SEM image of a CNT/CP film according to an embodiment of the present application. Scale bar shows 50.0 µm.

Referring to the schematic of FIG. 3, the BNNT/CP suspension (photograph at far left) is vacuum filtered (step 1) through the PTFE filter membrane and then the membrane and BNNT/CP film attached thereto are removed (step 2) from the filter apparatus. After the filtration of the suspension was completed, the NT/CP film was rinsed with $CHCl_3$ or THF, removed with the PTFE membrane and dried flat for 15 hours at room temperature between parchment and cellulose filter paper. To remove traces of solvent, the NT/CP films were peeled from the filter membrane, transferred to Teflon™ films and dried at 75° C. in a vacuum oven for 2 hours. FIG. 3 also shows an example of a BNNT/polyfluorene C18 film (upper right photograph; other polyfluorene films look similar) and a BNNT/polythiophene C6 (P3HT) which can be folded (lower right photograph; purple lilac in color). FIG. 4 shows an SEM image of a polyfluorene C18/CNT film. In FIG. 4, the nano/microscale roughness on the nanotube film can be clearly observed; i.e. the nanotubes have penetrated the cavities on the rough side of the membrane (FIG. 2; right hand image) and are now sticking out of the templated film.

Figure 5:
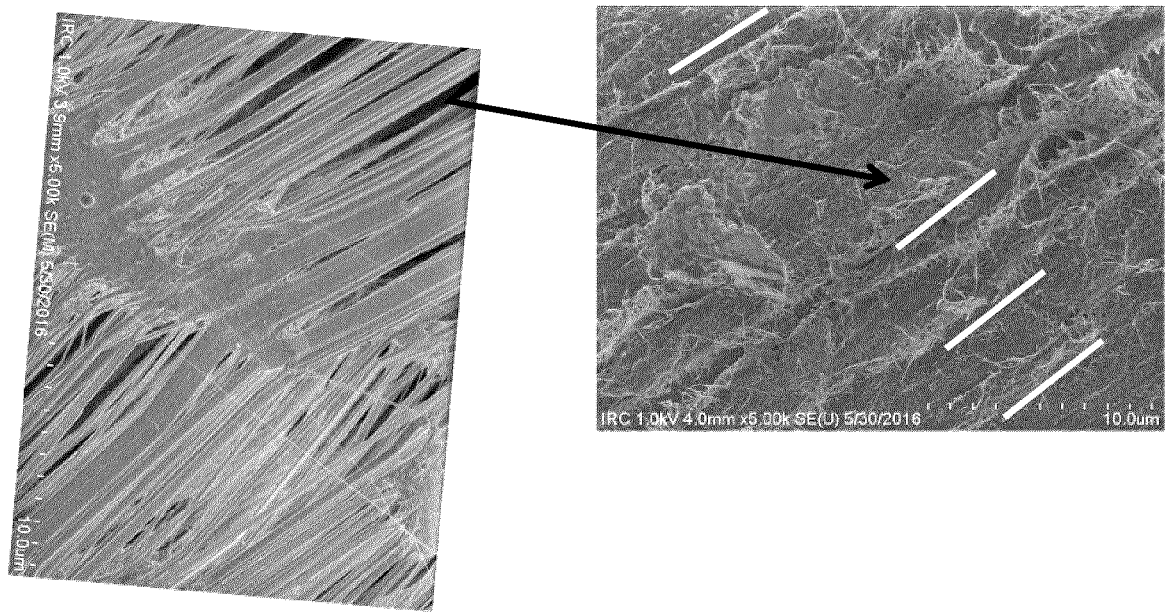
FIG. 5 shows SEM images of the filter membrane used in embodiments of the present application (left) and a BNNT/CP film (right) prepared using the filter membrane as a template, showing micron scale roughness created by the membrane pattern (white lines). Scale bar shows 10.0 µm.

FIG. 5 shows additional SEM images of the filter membrane (left) and an exemplary BNNT/Polyfluorene C18 film (right) prepared using the filter membrane as a template, showing micron scale roughness created by the membrane pattern (white lines).

Figure 6:
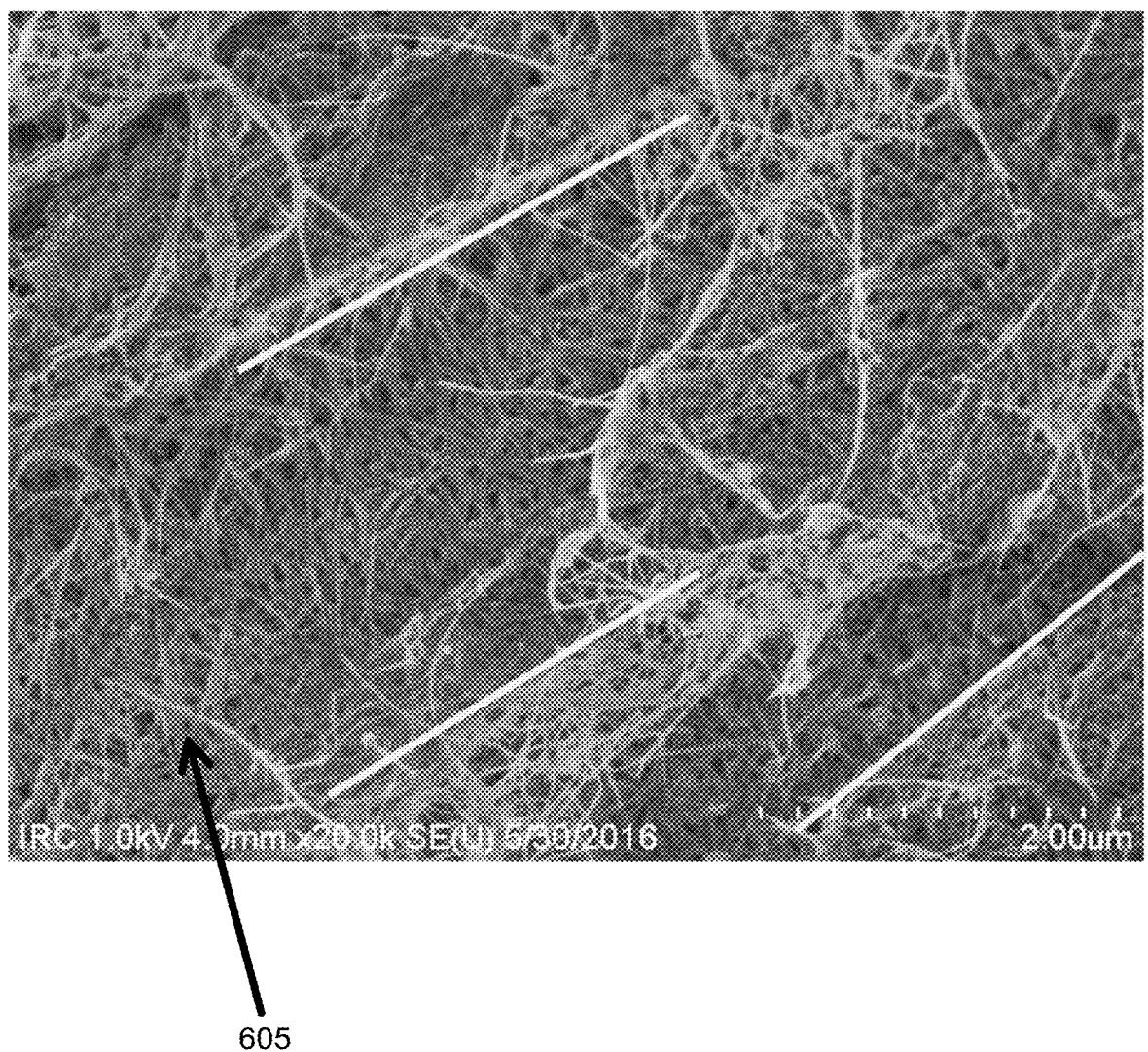
FIG. 6 is an SEM image of an exemplary BNNT/CP film at higher magnification, showing micron scale roughness created by the membrane pattern (white lines) and individual nanotubes (black arrow). Scale bar shows 2.0 µm.

FIG. 6 is an SEM image at higher magnification which shows individual nanotubes which are sticking out in a site of microscale roughness.

Contact angle measurements: The static water contact angle was acquired with an Attension Theta Optical Tensiometer. Deionized water (10-12 µL) was put onto the film using a micropipette and the average contact angle was obtained by measuring the contact angle at different places of the sample and averaging at least five data points. Measured contact angles are provided in Table 2.

Figure 7:
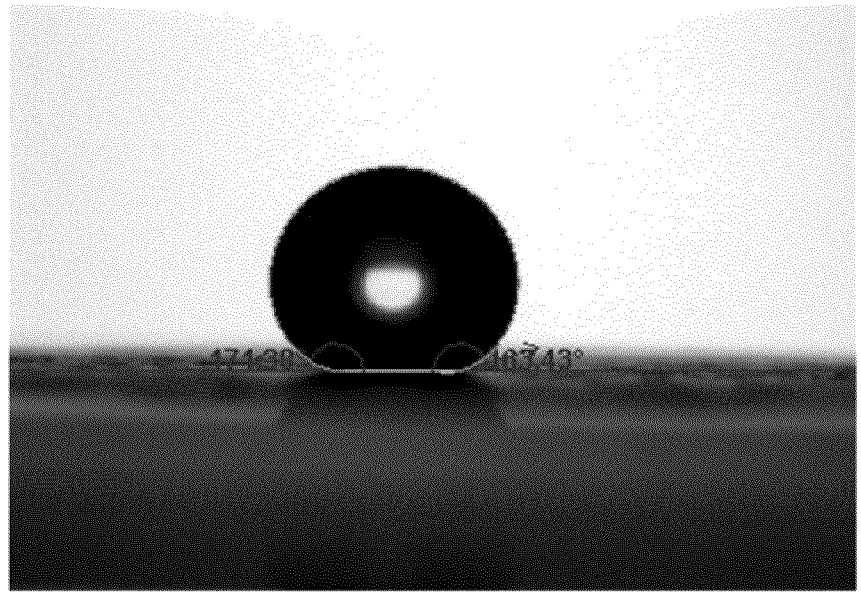
FIG. 7 shows photographs of the water contact angle of the membrane side of an exemplary BNNT/CP film (top) in comparison to the water contact angle of the side not templated by the membrane (bottom).
Figure 7:
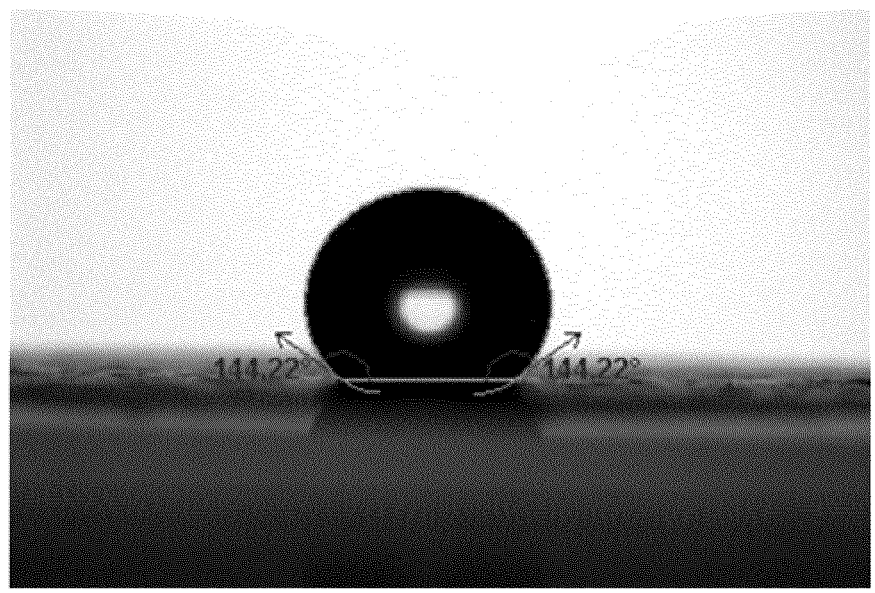

FIG. 7 provides a comparison of the water contact angle of the membrane side of a BNNT/CP Polyfluorene-C18-Pyridine film (average =165°) and the water contact angle of the side not templated by the membrane (average=about 144°). The templated side is superhydrophobic whereas the non-templated side has a significantly lower contact angle and is only hydrophobic.

Figure 8:
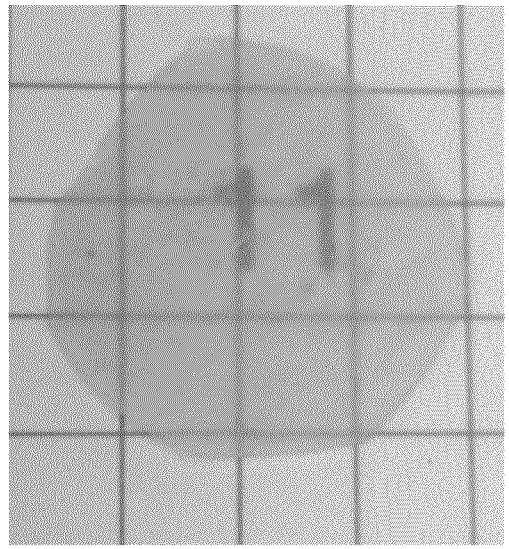
FIG. 8 shows photographs of exemplary BNNT/polyfluorene films transferred onto polycarbonate (top) and glass (bottom).
Figure 8:
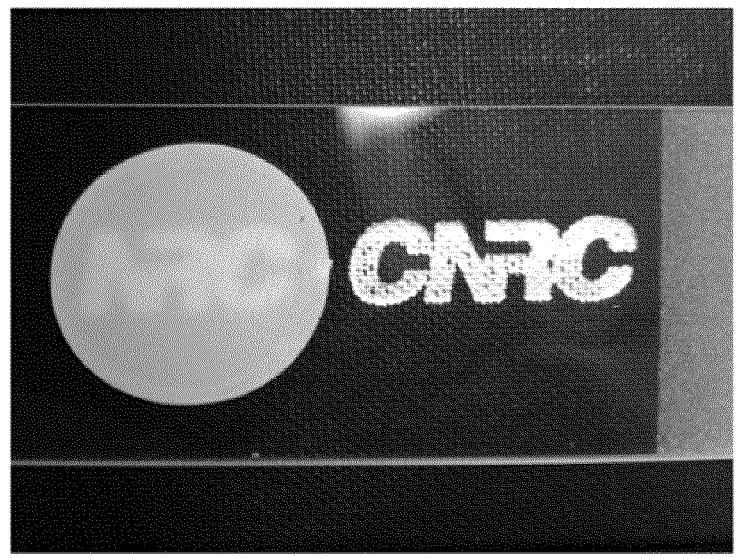

Film transfer to different substrates: The obtained free standing films can be transferred to different substrates (e.g. glass and thermoplastics). For example, as shown in the photographs in FIG. 8, BNNT/polyfluorene C18 films were transferred onto polycarbonate (upper image) and glass (lower image).

Figure 9:
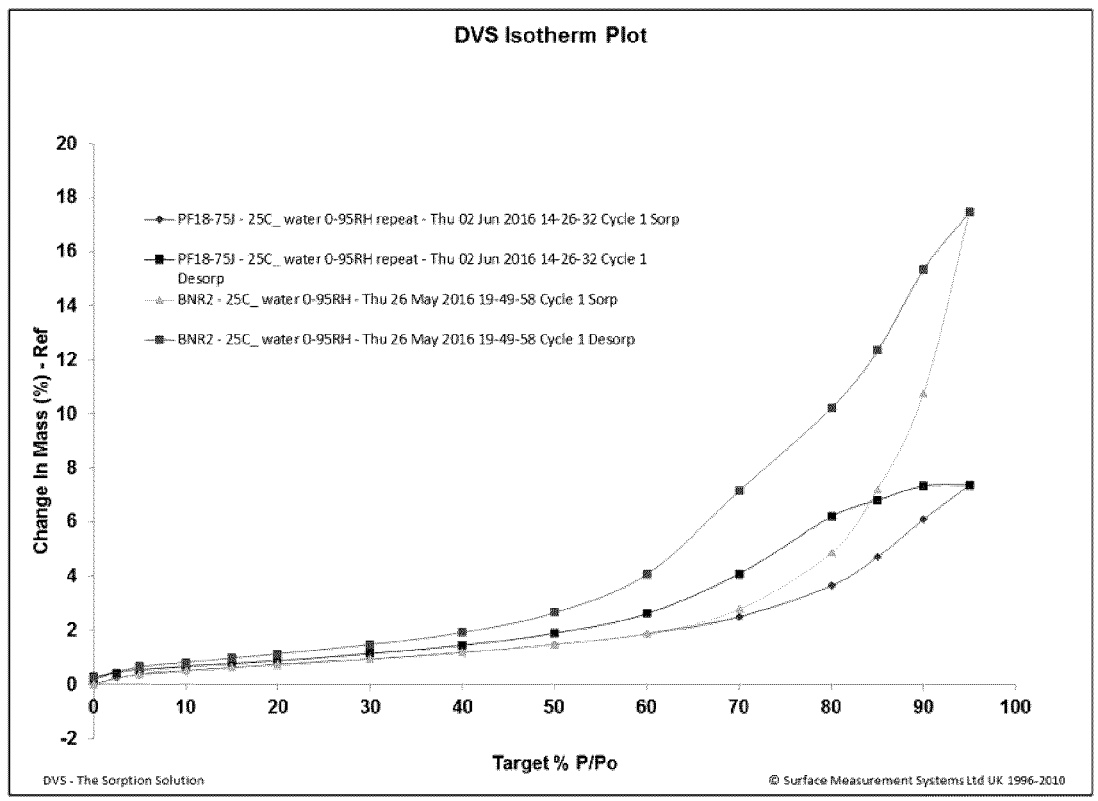
FIG. 9 is a plot showing water adsorption isotherms of BNNTs before and after functionalization with a polyfluorene C18 conjugated polymer according to exemplary embodiments of the present application.

Water vapour adsorption: Experiments were performed using an automated multi-vapor sorption analyzer (DVS Advantage 1, from Surface Measurement Systems, SMS). FIG. 9 shows water sorption isotherms obtained for pristine BNNTs and BNNTs functionalized with polyfluorene C18. After functionalization, the water vapour uptake is significantly reduced (e.g. from about 15% to about 7% at 95% relative humidity) as a consequence of a reduction in the surface energy after functionalization.

There are many applications of BNNTs for which additional superhydrophobic and self-cleaning properties may be desirable to enhance their conventional functionality for example but not limited to thermally conductive electrical insulators, neutron shielding, transparent adhesives and coatings, biomedical composites and/or piezoelectric energy harvesting. Superhydrophobic BNNT films may also be utilized, for example, as a protective coating for creating a self-cleaning, non-stick surface (e.g., for solar panels).

While the present application has been described with reference to what are presently considered to be the preferred examples, it is to be understood that the application is not limited to the disclosed examples. To the contrary, the present application is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE DESCRIPTION

[1] L. B. Boinovich, A. M. Emelyanenko, A. S. Pashinin, C. H. Lee, J. Drelich, and Y. K. Yap, "Origins of Thermodynamically Stable Superhydrophobicity of Boron Nitride Nanotubes Coatings" *Langmuir*, 2012, 28, 1206-1216.

[2] F. De Nicola, P. Castrucci, M. Scarselli, F. Nanni, I. Cacciotti and M. De Crescenzi, "Multi-Fractal Hierarchy of Single-Walled Carbon Nanotube Hydrophobic Coatings" *Scientific Reports* 2015, 5:8583, DOI: 10.1038/srep08583.

[3] Z. Gao, K. Fujioka, T. Sawada, C. Zhi, Y. Bando, D. Golberg, M. Aizawa and T. Serizawa, "Noncovalent functionalization of boron nitride nanotubes using water-soluble synthetic polymers and the subsequent preparation of superhydrophobic surfaces" *Polymer Journal* 2013, 45, 567-570.

[4] Z. Gao, C. Zhi, Y. Bando, D. Golberg and T. Serizawa, "Noncovalent functionalization of boron nitride nanotubes in aqueous media opens application roads in nano-biomedicine" Nanobiomedicine, 2014, 1:7, doi: 10.5772/60000.

[5] (a) J. Ding, Z. Li, J. Lefebvre, F. Cheng, G. Dubey, S. Zou, P. Finnie, A. Hrdina, L. Scoles, G. P. Lopinski, C. T. Kingston, B. Simard and P. R. L. Malenfant, "Enrichment of large-diameter semiconducting SWCNTs by polyfluorene extraction for high network density thin film transistors" Nanoscale, 2014, 6, 2328-2339; (b) J. Ding, M. Day, G. Robertson and J. Roovers, "Synthesis and characterization of alternating copolymers of fluorene and oxadiazole" Macromolecules 2002, 35, 3474-3483; (c) Y. Li, J. Ding, M. Day, Y. Tao, J. Lu and M. D'iorio, "Synthesis and properties of random and alternating fluorene/carbazole copolymers for use in blue light-emitting devices. Chem. Mater., 2004, 16, 2165-2173.

TABLE 2

| Conjugated Polymer (CP) | Contact Angle* [°] |
| --- | --- |
| Thiophene C6 | 154 ± 5 |
| Thiophene C18 | 169 ± 3 |
| Polyfluorene C8 | 160 ± 3 |
| Polyfluorene C18 | 163 ± 5 |
| Polyfluorene-C18-Pyridine | 165 ± 3 |

*mean; average of 5 measurements

The invention claimed is:

1. A method for preparing a superhydrophobic nano-microscale patterned film, the method comprising:
    filtering at least one suspension comprising high aspect ratio nanoparticles non-covalently functionalized with a conjugated polymer bearing alkyl side-chains in an organic solvent through a membrane having a desired microscale surface morphology to obtain a wet film, wherein the membrane microscale surface morphology is templated on a surface of the wet film; and
    drying the film to obtain the nano-microscale patterned superhydrophobic film.

2. The method of claim 1, wherein the at least one suspension is prepared by mixing a solution comprising the conjugated polymer bearing alkyl side-chains with a suspension comprising the high aspect ratio nanoparticles.

3. The method of claim 1, wherein one suspension comprising high aspect ratio nanoparticles non-covalently functionalized with a conjugated polymer bearing alkyl side-chains in an organic solvent is filtered through the membrane having a desired microscale surface morphology.

TABLE 1

| Structure | Substituents/ Regioregularity | $M_n$* (kDa) | PDI** | Source |
| --- | --- | --- | --- | --- |
| 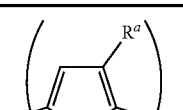 Polythiophene (PT) | $R^a = C_6H_{13}$ Regio-Random | 34 | 1.35 | Rieke Metals, Inc. |
| | $R^a = C_6H_{13}$ Regio-Regular | 60 | 2.3 | Rieke Metals, Inc. |
| | $R^a = C_{18}H_{37}$ Regio-Regular | 50.9 | 1.35 | Rieke Metals, Inc. |
| 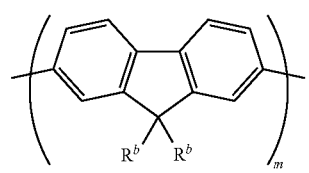 Polyfluorene (PF) | $R^b = C_8H_{17}$ | 22 | 2.41 | *** |
| | $R^b = C_{14}H_{29}$ | 13 | 3 | *** |
| | $R^b = C_{18}H_{37}$ | 59 | 4.5 | *** |
| 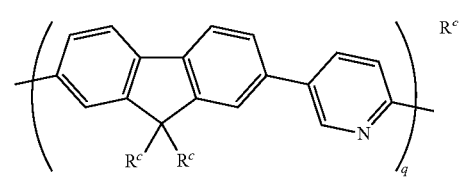 Polyfluorine-Pyridine (PFPy) | $R^c = C_{18}H_{37}$ | 38.5 | 3.21 | *** |

*number average molecular weight
**polydispersity index
***Synthesized by previously published methods; See: References 5(a)-(c).

4. The method of claim 3, wherein the high aspect ratio nanoparticles are boron nitride nanotubes (BNNTs) or carbon nanotubes (CNTs).

5. The method of claim 1 wherein two suspensions comprising high aspect ratio nanoparticles non-covalently functionalized with a conjugated polymer bearing alkyl side-chains in an organic solvent are filtered through the membrane having a desired microscale surface morphology.

6. The method of claim 5, wherein the suspensions are filtered sequentially, the high aspect ratio nanoparticles of the first suspension are CNTs and the high aspect ratio nanoparticles of the second suspension are BNNTs, or wherein the suspensions are filtered sequentially, the high aspect ratio nanoparticles of the first suspension are BNNTs and the high aspect ratio nanoparticles of the second suspension are CNTs.

7. The method of claim 1, wherein the solvent is chloroform or tetrahydrofuran (THF).

8. The method of claim 1, wherein the conjugated polymer is a polythiophene bearing alkyl side chains, a polyfluorene bearing alkyl side chains, a poly(fluorene-co-pyridine) bearing alkyl side chains, or a poly(thiophene-co-fluorene) bearing alkyl side chains.

9. The method of claim 8, wherein the conjugated polymer is selected from:

(a) a polythiophene of Formula I:

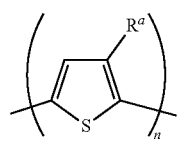

(I)

wherein $R^a$ is $C_{4-24}$alkyl and n is in the range for a soluble polythiophene of Formula I;

(b) a polyfluorene of Formula II:

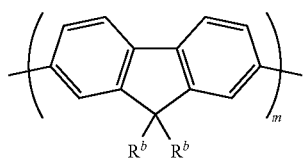

(II)

wherein each $R^b$ is independently $C_{6-24}$alkyl and m is in the range for a soluble polyfluorene of Formula II; and (c) a poly(fluorene-co-pyridine) of Formula III:

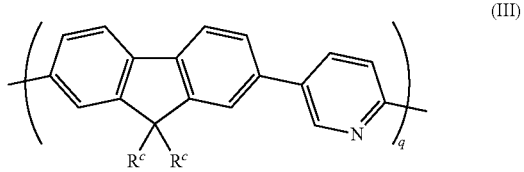

(III)

wherein each $R^c$ is independently $C_{6-24}$alkyl and q is in the range for a soluble poly(fluorene-co-pyridine) of Formula III.

10. The method of claim 9, wherein n is an integer of from 10-200, m is an integer of from 10-100 and q is an integer of from 10-100.

11. The method of claim 9, wherein $R^a$ is n-hexyl or n-octadecyl; each $R^b$ is n-octyl or n-octadecyl; and each $R^c$ is n-octadecyl.

12. The method of claim 1, wherein the ratio by weight of the high aspect ratio nanoparticles to the conjugated polymer is from about 1:0.05 to about 1:1, or about 1:0.15.

13. The method of claim 1, wherein the membrane comprises poly(1,1,2,2-tetrafluoroethylene).

14. The method of claim 1, wherein the membrane has a pore size of from about 0.2 µm to about 20 µm, or about 1.2 µm.

15. The method of claim 1, wherein in the step of filtering the suspension, the membrane is housed in a filtration assembly and the method further comprises, prior to drying, removing the membrane with the wet film attached thereto from the filtration assembly.

16. The method of claim 15, wherein the step of drying comprises drying the wet film attached to the membrane on a flat surface at ambient temperature and pressure followed by peeling the semi-dried film from the membrane and drying further at elevated temperature and reduced pressure.

* * * * *